US006241218B1

(12) United States Patent
Tanitomi

(10) Patent No.: US 6,241,218 B1
(45) Date of Patent: Jun. 5, 2001

(54) CHEMICAL DIFFUSION DEVICE HAVING A MATERIAL FOR ABSORBING LIQUID CHEMICAL AND TRANSFERRING THE CHEMICAL TO A GAS FLOW

(75) Inventor: Fuminao Tanitomi, Kumamoto (JP)

(73) Assignee: Yuugen Kaisha Kaishin (JP)

( * ) Notice: Subject to any disclaimer, the term of this patent is extended or adjusted under 35 U.S.C. 154(b) by 0 days.

(21) Appl. No.: 09/183,986

(22) Filed: Nov. 2, 1998

Related U.S. Application Data

(63) Continuation-in-part of application No. 08/561,459, filed on Nov. 21, 1995, now Pat. No. 5,829,188.

(51) Int. Cl.[7] .......... B01F 3/04

(52) U.S. Cl. .......... 261/30; 261/104; 261/DIG. 65; 422/124

(58) Field of Search .......... 261/30, 104, 107, 261/DIG. 65; 422/124

(56) References Cited

U.S. PATENT DOCUMENTS 1,254,337 * 1/1918 Marsh .......... 422/124
2,031,055 * 2/1936 McKinney .......... 261/104
2,104,209 * 1/1938 Pierson .......... 261/107

FOREIGN PATENT DOCUMENTS

451546 * 10/1948 (CA) .......... 261/30
279000 * 10/1927 (GB) .......... 261/104

* cited by examiner

*Primary Examiner*—David A. Simmons
*Assistant Examiner*—Robert A. Hopkins
(74) *Attorney, Agent, or Firm*—Morrison Law Firm

(57) ABSTRACT

A permeable saturation body absorbs a liquid chemical for evaporative dispersion. External air is forced through the saturation body to vaporize and carrying the liquid chemical into a prescribed area. The liquid container and permeable body are mounted on a permeable support structure. Excess liquid dripping from the permeable saturation body is recaptured and redistributed by another permeable saturation body located below the first permeable saturation body. The device can be used in greenhouses to disperse insecticide into the air or along the ground. The device is also adapted to disperse deodorant or a bactericide for use in hospitals or restaurants, for example. One embodiment of the invention provides for reversible air flow so that a user can choose between dispensing the liquid chemical in a low position, or in a high position.

15 Claims, 4 Drawing Sheets

CHEMICAL DIFFUSION DEVICE HAVING A MATERIAL FOR ABSORBING LIQUID CHEMICAL AND TRANSFERRING THE CHEMICAL TO A GAS FLOW

This is a continuation-in-part of pending application Ser. No. 08/561,459 filed Nov. 21, 1995, now U.S. Pat. No. 5,829,188.

BACKGROUND OF THE INVENTION

The present invention relates to a chemical diffusion device for use in facilities such as greenhouses, hospitals and restaurants.

Greenhouses are often used for production of such staples as strawberries, melons, cucumbers and tomatoes. Oil is often used to heat the greenhouses, resulting in a warm, moist environment. This environment, combined with good lighting, provides an ideal setting for the proliferation of various noxious insects. Generally, insect population growth has been checked by manual application of liquids such as agricultural pesticides. Usually, these pesticides are sprayed on the particular plants by a laborer.

Hospitals, restaurants and food processing plants tend to have problems with insects as well. However, these types of facilities also suffer from problems related to bacteria and noxious odors. These problems also can be eliminated by application of a liquid pesticide, bactericide or deodorant.

Application of the above liquids by manual spraying can be an irritating and annoying inconvenience. In addition, inhalation of fumes from these liquids can pose a health hazard. It is also a difficult task to place the liquids in an appropriate setting to accomplish their designed function.

OBJECT AND SUMMARY OF THE INVENTION

It is therefore an object of the present invention to provide a chemical diffusion device which overcomes the drawbacks of the prior art.

It is a further object of the invention to provide a chemical diffusion device for effectively diffusing chemicals such as insect extermination liquids, bactericides and deodorants.

It is a further object of the invention to provide a chemical diffusion device which can be operated to diffuse chemicals along the ground or in the air.

Briefly stated, the present invention provides a permeable saturation body that absorbs a liquid chemical for evaporative dispersion. External air is forced through the saturation body to vaporize and carrying the liquid chemical into a prescribed area. The liquid container and permeable body are mounted on a permeable support structure. Excess liquid dripping from the permeable saturation body is recaptured and redistributed by another permeable saturation body located below the first permeable saturation body. The device can be used in greenhouses to disperse insecticide into the air or along the ground. The device is also adapted to disperse deodorant or a bactericide for use in hospitals or restaurants, for example. One embodiment of the invention provides for reversible air flow so that a user can choose between dispensing the liquid chemical in a low position, or in a high position.

According to an embodiment of the invention, there is provided a chemical diffusion device comprising: a case having a first opening in a first end and a second opening in a second end, at least one container in the case for containing a liquid chemical, the container having an open upper end, at least one support body supporting the container, the support body permitting the passage of air therethrough, a material on a surface of the support body, the material having an end disposed to contact the liquid chemical in the container, the material being of a type capable of absorbing the liquid chemical through capillary action, the material being gas-permeable, an inner surface of the material being exposed to the first opening, an outer surface of the material being exposed to the second opening, and means for moving air into one of the first opening and the second opening, and out the other thereof, whereby the air passes through the material, and evaporates the liquid chemical.

Advantageously, the at least one container includes a first container, the at least one container further includes a second container, the second container being disposed below a lower end of the material to collect an excess of the liquid chemical from the material, a second support body below the second container, a second support body supporting a second material, and the second material receiving an overflow of the liquid chemical from the second container, whereby evaporation of the liquid chemical is increased.

According to another embodiment of the invention, there is provided a chemical diffusion device comprising: a case having a first opening in a first end and a second opening in a second end, a plurality of containers including a first, second and third container in the case for containing a liquid chemical, the containers having an open upper end, a plurality of gas-permeable support bodies including a first support body above a second support body, the support bodies supporting a gas-permeable material on a surface of the support bodies, the material being of a type capable of absorbing the liquid chemical and having an end disposed to contact the liquid chemical in the first container, the material having a lower end disposed to drip into the second container to collect an excess of the liquid chemical from the material, the material on a surface of the second support body receiving an overflow of the liquid chemical from the second container, an outer surface of the material being exposed to the first opening, an inner surface of the material being exposed to the second opening, and means for moving air into one of the first opening and the second opening, and out the other thereof, whereby the air passes through the material, and evaporates the liquid chemical.

The present invention includes a container that stores a liquid chemical. The liquid chemical feeds into a permeable saturation body from the container via capillary action. The permeable saturation body is mounted on a permeable support body. A fan vaporizes the liquid chemical by passing air over and through the permeable saturation body. The device includes a motor for turning the fan.

In the above configuration, the permeable saturation body is saturated by the liquid chemical fed from the storage container via capillary action. The fan is rotated by the motor so that air passes through permeable saturation body. The motion of the air passing the permeable saturation body causes the liquid saturated therein to evaporate. The liquid chemical, now an evaporated and vaporized gas, diffuses into the surrounding prescribed area.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
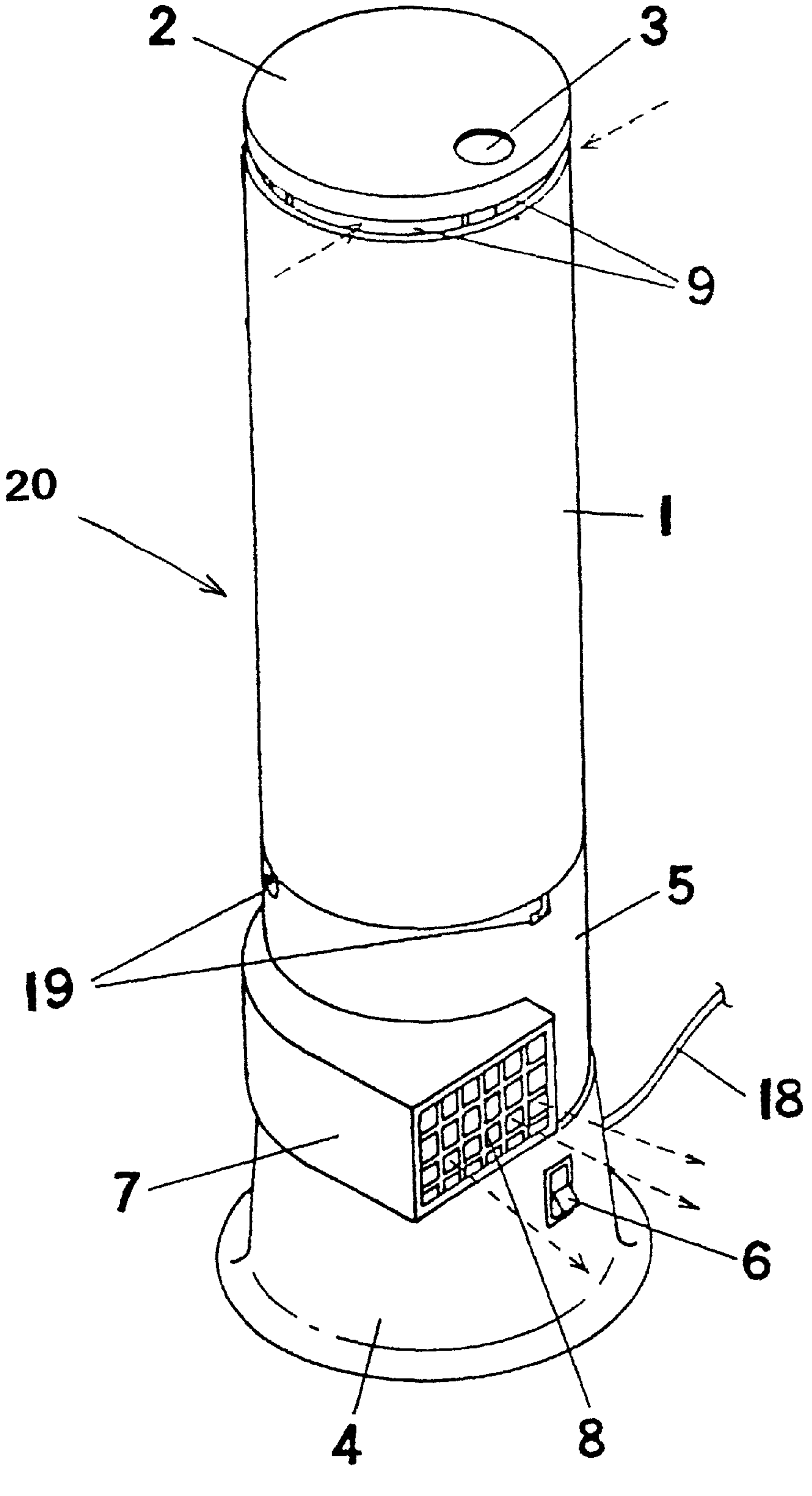
FIG. 1 is a perspective view of a chemical diffusion device according to an embodiment of the invention.

Referring to FIG. 1, the chemical diffusion device, shown generally at 20 according to the present invention, is used to exterminate various kinds of insects in facilities such as restaurants or greenhouses. Device 20 has a case 1 and a cap 2 removably mounted on an upper portion of case 1. An intake hole 3 is formed in cap 2 to allow the insect extermination chemical to be placed within device 20. A middle cylinder 5 is mounted above a cylindrical base 4. Case 1 is removably mounted above middle cylinder 5.

A stopping piece 19 detachably engages case 1 and middle cylinder 5. A power switch 6 is disposed on an outer surface of cylindrical base 4. A hood 7 is disposed on the outer surface of middle cylinder 5. A ventilation opening 8 is formed in a surface of hood 7. A slit-shaped opening 9 is formed between case 1 and cap 2.

Figure 2:
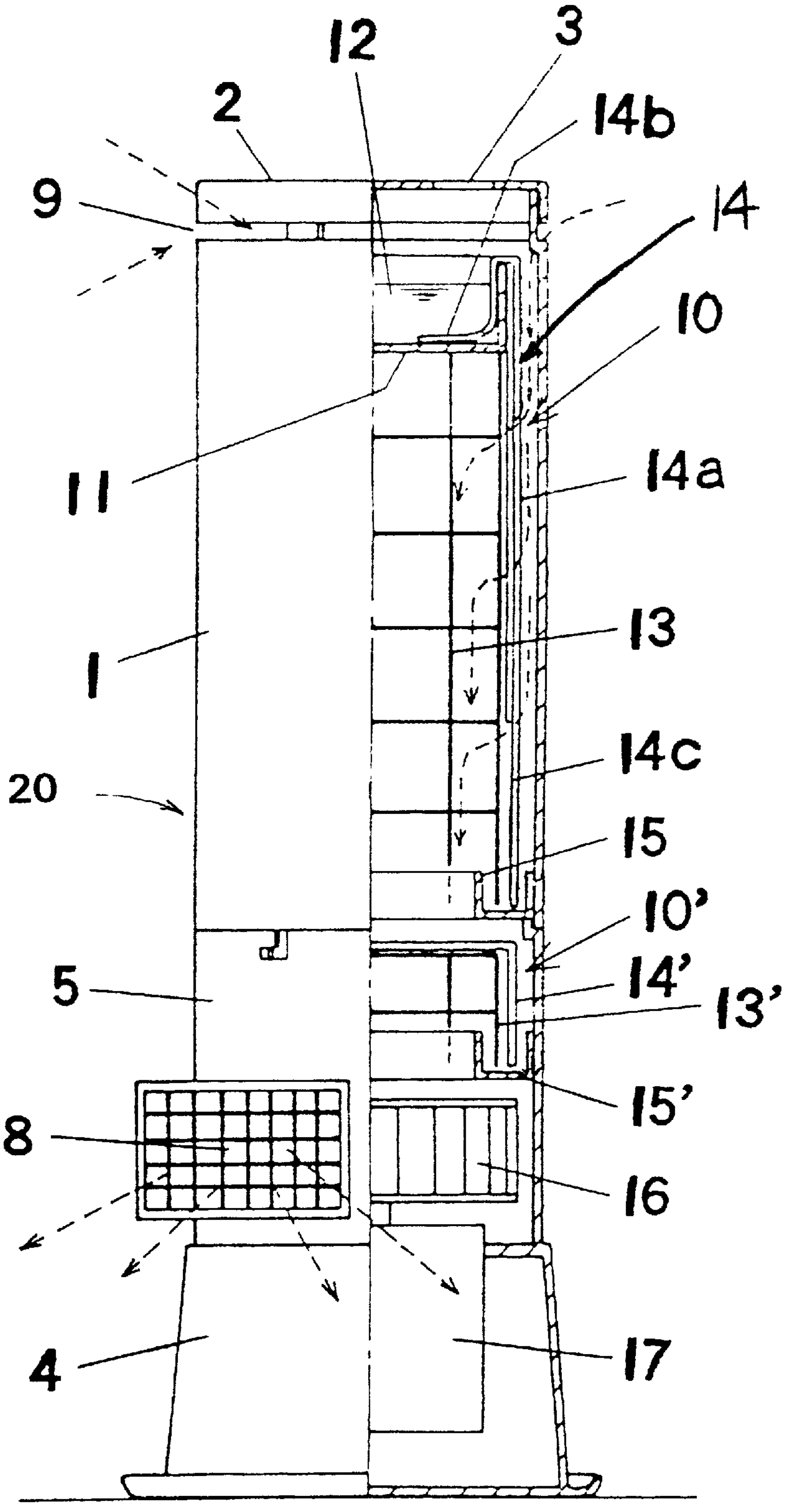
FIG. 2 is a view of the device of FIG. 1 wherein a section of the exterior is cut away to reveal interior parts.
Figure 3:
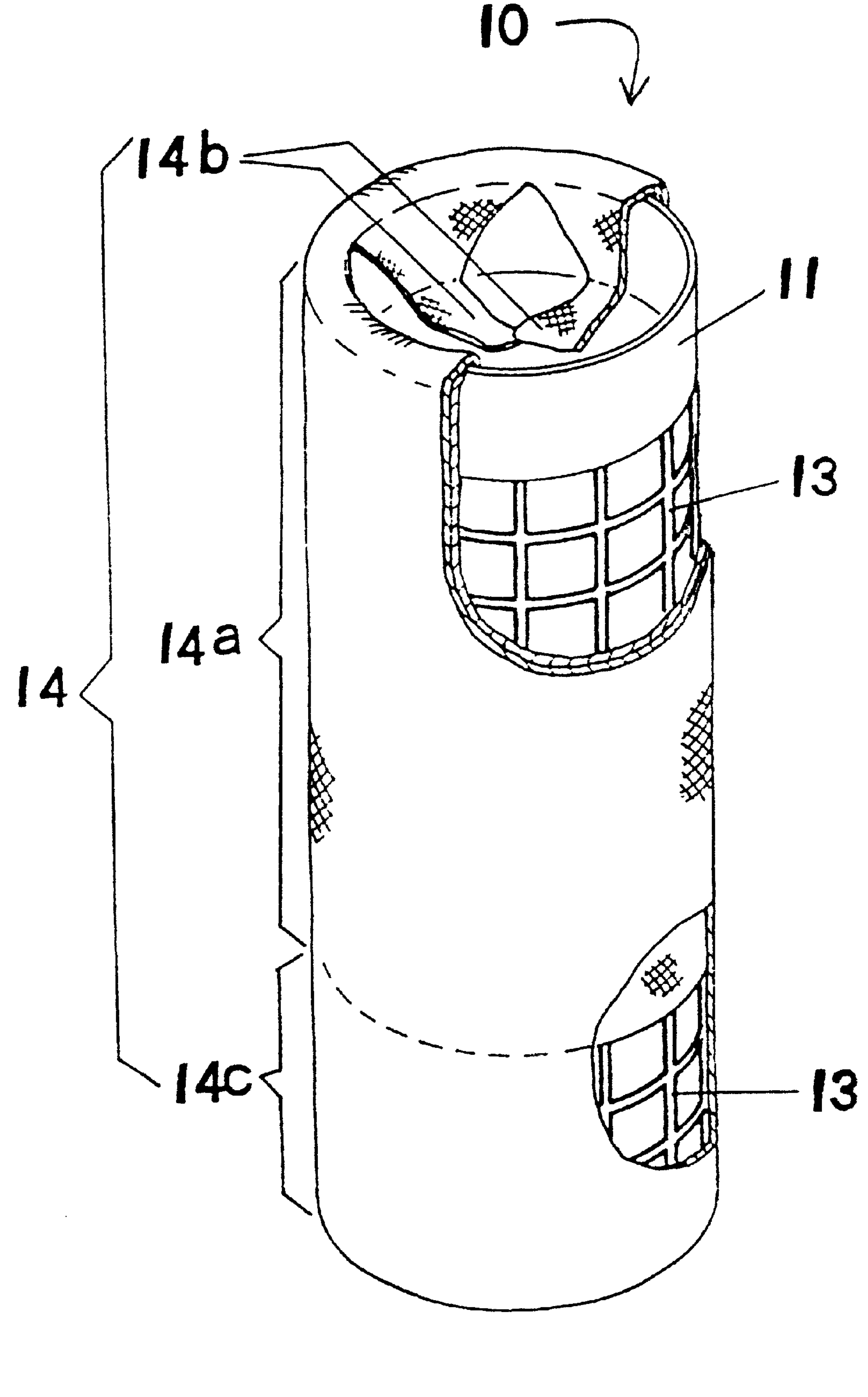
FIG. 3 is a partially cut away perspective view of the vaporization unit of the chemical diffusion device.
Figure 4:
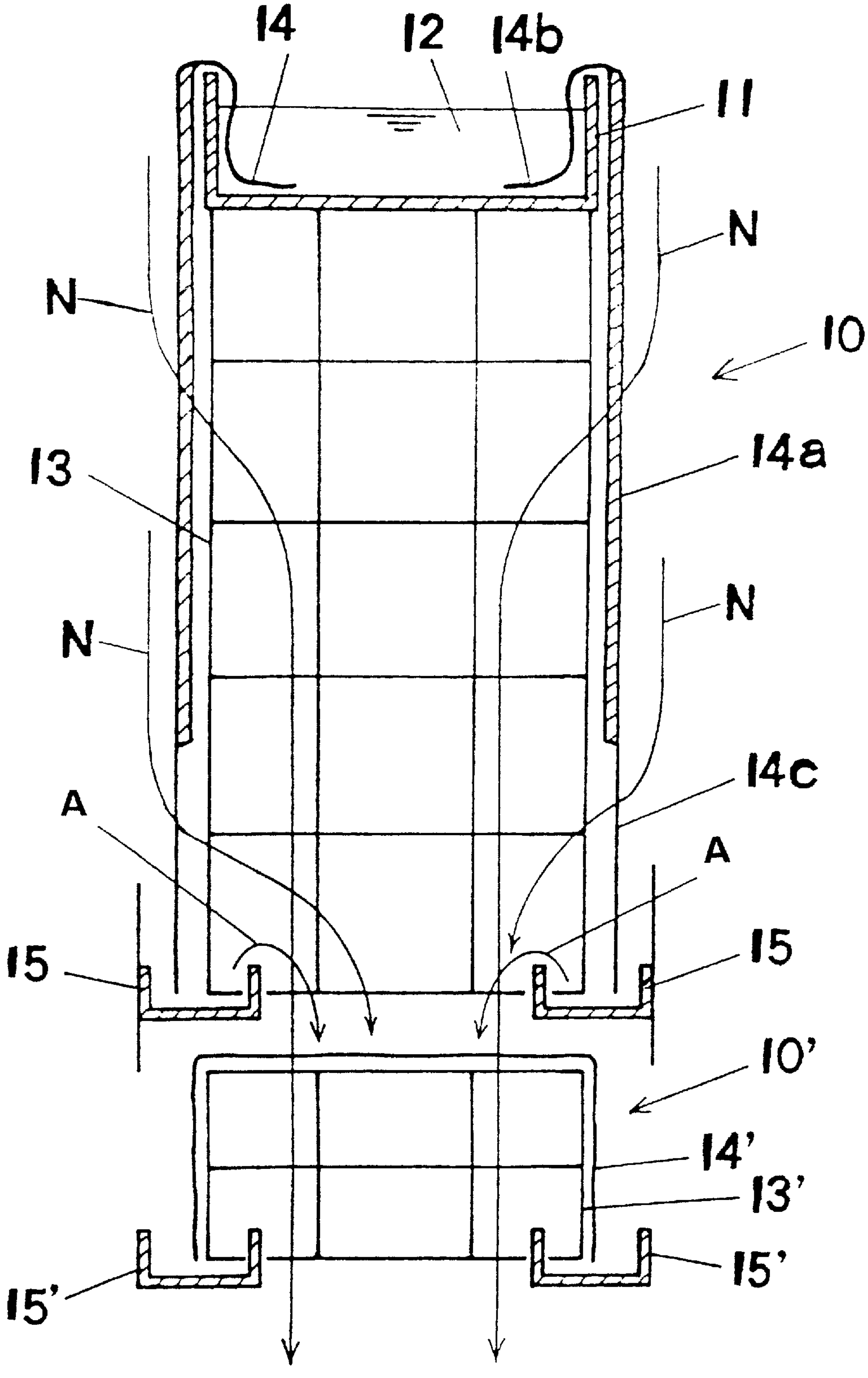
FIG. 4 is a cross-section view of the vaporization unit in FIG. 2.

Referring to FIGS. 2, 3 and 4, a vaporizing unit 10, located within case 1, vaporizes the insect exterminating liquid chemical 12. Liquid chemical 12 is stored in a circular plate-shaped liquid storage container 11. Liquid storage container 11 is mounted above a support 13. Support 13 is permeable since it is constructed from a cylindrically shaped lattice frame. A gauze 14 is mounted on a surface of support 13 to act as a permeable saturation body. Support 13 provides a structure for supporting both liquid storage container 11 and gauze 14. Gauze 14 includes a thick portion **14*a*, which can contain large amounts of chemical 12, and a thin tongue portion 14*b* on an upper end. Tongue portion 14*b* curls over the upper edge of liquid container 11 to be immersed in chemical 12. A thin portion 14*c* is formed on a lower end of gauze 14. Support 13 is disposed above a ring-shaped container 15. A lower end of thin portion 14*c* is positioned within ring-shaped container 15. Vaporizing unit 10 can be removed from middle cylinder 5 along with case 1. After removal, vaporizing unit 10 is easily replaced in case 1. Easy replacement of vaporizing unit 10 makes handling and maintenance of device 20** simple and more efficient.

Tongue portion **14*b* feeds liquid chemical 12 from liquid container 11 to gauze 14 by capillary action. Liquid chemical 12 seeps downward into thick portion 14*a* and then into thin portion 14*c*. 12. A substantial part of liquid chemical 12 is evaporated from thick portion 14*a* and thin portion 14*c*. Ring-shaped container 15 accumulates remaining unevaporated excess liquid chemical 12 that drips down from the lower end of thin portion 14*c*. The feeding and seeping processes keep gauze 14 constantly saturated with liquid chemical. When most or all of liquid chemical 12 has been removed in this way, container 11 is refilled through intake hole 3**.

Referring to FIGS. 2 and 4, a sub-vaporizing unit 10' is located within middle cylinder 5. Sub-vaporizing unit 10' has roughly the same configuration as above described vaporizing unit 10. A support 13' is a cylindrically shaped lattice frame on which a gauze 14' is mounted and supported. Gauze 14' is supported by a top surface and other outer surfaces of support 13' . Support 13' and the lower end of gauze 14' are mounted on a ring-shaped container 15'. Liquid chemical 12 that overflows from ring-shaped container 15 in vaporizing unit 10 flows down to a top surface of gauze 14' of sub-vaporizing unit 10', as indicted by arrows A in FIG. 4. Gauze 14' becomes saturated by the overflow of chemical 12. Excess liquid chemical 12 from saturated gauze 14' drips down and is stored in ring-shaped container 15'. Sub-vaporizing unit 10' thus recovers and evaporates excess liquid chemical 12 that has dripped off of ring-shaped container 15.

Referring to FIGS. 1 and 2, a sirocco fan 16, disposed below sub-vaporizing unit 10', is driven by a motor 17 disposed within cylindrical base 4. A power cord 18 connects motor 17 to a power source. When power switch 6 is moved to the "ON" position, motor 17 rotates fan 16 to draw air from outside cylindrical into case 1 through slit-shaped opening 9. It should be readily recognized that motor 17 and fan 16 can be replaced by other means for moving air, such as a compressed or pressurized air line feed.

Handling and operation of device 20 of the present invention is described as follows. Chemical diffusion device 20 of the present invention is installed in an appropriate position within a greenhouse. Power switch 6 is moved to the "ON" position, causing motor 17 to rotate fan 16. Fan 16 draws air from outside case 1 into device 20 through slit-shaped opening 9. The drawn-in air passes through gauze 14, as indicated by arrows N in FIG. 4. The drawn-in air then exits device 20 through ventilation opening 8. The passing air evaporates liquid chemical 12 as it passes through and around saturated gauze 14. The vaporized gas is blown out with the air to exterminate insects within the greenhouse, or for other purposes. FIGS. 1 and 2 show the flow of air with dashed arrows. The air drawn into case 1 through slit-shaped opening 9 tends to pass through thick portion **14*a* of gauze 14. When saturated, thick portion 14*a* retains large amounts of chemical 12. The large amounts of liquid chemical 12 retained prevent thick portion 14*a*** from drying out.

Produce grown near the ground, for example strawberries, benefits from gas produced by device 20 according to the present invention when the gas is blown toward the ground. Likewise, insects such as cockroaches that may be found near the ground or the floor in restaurants and the like are exterminated by a ground-directed stream of gas from device 20.

In applications such as those described above, it is desirable to keep the gas at a low temperature and a high specific gravity. Air passing through gauzes 14, 14' of present device 20 vaporizes chemical 12. The vaporization of liquid chemical 12 saturated within gauzes 14, 14' produces evaporative cooling which results in a temperature drop. Active methods for lowering the gas temperature can also be used. Active methods include cooling insect exterminating liquid chemical 12 in a refrigerator before insertion into liquid container 11, and putting chunks of ice into liquid container 11. Using these means to actively lower the temperature of the gas is desirable because the increase in specific gravity allows the gas to diffuse along the ground or floor. The present invention therefore does not necessarily require active cooling of the liquid that is converted to a gas.

Produce grown upright or in the air, melons or tomatoes for example, presents another application for device 20 according to the present invention. In this situation it is desirable to have the gas used to exterminate pests blown upward into the air. Device 20 according to the present invention accomplishes this goal by causing motor 17 to rotate in an opposite direction. When motor 17 rotates in an opposite direction, fan 16 draws air into device 20 through lower ventilation opening 8. The drawn-in air passes outward through saturated gauzes 14' and 14 and then through upper slit-shaped opening 9. The gas expelled through upper slit-shaped opening 9 is dispersed into the surrounding air. The above is an effective method for exterminating insects that attach themselves to produce such as melons, tomatoes and the like above the ground.

In order to provide for moving air selectively upward and downward, as described above, power switch 6 has two "ON" positions, separated by an "OFF" position. One of the positions controls driving of fan 16 in one direction, and the other position controls driving of the fan 16 in the opposite direction.

Chemical diffusion device 20 according to the present invention can also be used in other applications. For example, device 20 can be installed in food processing plants or hospitals to exterminate insects that crawl on the ground such as cockroaches. Device 20 can be made to have a sanitary function by replacing the exterminating liquid with a bactericide such as formalin. Device 20 in such a configuration destroys unwanted bacteria in a hospital or other such facility. Alternatively, liquid chemical 12 in container 11 can be a deodorant. Device 20 in this configuration acts as a deodorizer.

As illustrated by these brief examples, the chemical diffusion device 20 according to the present invention has a wide variety of applications. Moreover, the present invention is not restricted to the above described embodiments. For example, a small hole at the bottom of liquid storage container 11 would allow the insect exterminating liquid chemical 12 to drip down and saturate gauze 14'.

The above described device 20 according to the present invention efficiently exterminates insects that live on the ground in greenhouses and other similar structures. Device 20 also exterminates insects or pests that are present on produce grown on the ground such as strawberries. Device 20 also can be configured to exterminate insects on produce grown suspended in air, such as melons and tomatoes. Device 20 according to the invention also exterminates cockroaches and other pests on the floors of facilities such as restaurants and hospitals. The present invention can also be used as a bactericide device 20 or a deodorizer in a hospital or other facilities where bacteria and odor are undesirable.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A chemical diffusion device comprising:

a case having a first opening in a first end and a second openings in a second end;

at least one container in said case for containing a liquid chemical:

said container having an open upper end;

at least one support body;

a material on a surface of said support body;

said material having an end disposed to contact said liquid chemical in said container;

said material being of a type capable of absorbing said liquid chemical from said container through capillary action;

said material being gas-permeable;

a surface of said material being exposed to said first opening;

an other surface of said material being exposed to said second opening;

means for moving air into one of said first opening and said second opening, and out the other thereof whereby said air passes through said material, and evaporates said liquid chemical; and said first opening is higher than said second opening, and said means for moving includes means for drawing air into said second opening and out said first opening.

2. A chemical diffusion device comprising:

a case having a first opening in a first end and a second opening in a second end;

at least one container in said case for containing a liquid chemical;

said container having an open upper end;

at least one support body;

a material on a surface of said support body;

said material having an end disposed to contact said liquid chemical in said container;

said material being of a type capable of absorbing said liquid chemical from said container through capillary action;

said material being gas-permeable;

a surface of said material being exposed to said first opening;

an other surface of said material being exposed to said second opening;

means for moving air into one of said first opening and said second opening, and out the other thereof, whereby said air passes through said material, and evaporates said liquid chemical;

said at least one container includes a first container;

said at least on container further includes a second container;

said second container being disposed below a lower end of said material to collect an excess of said liquid chemical from said material;

a second support body below said second container;

said second support body supporting a second material; and said second material receiving an overflow of said liquid chemical from said second container, whereby evaporation of said liquid chemical is increased.

3. A chemical diffusion device according to claim 2, further comprising:

said at least one container further includes a third container; and said third container being disposed below a lower end of said second material to collect an excess of liquid chemical from said second material.

4. A chemical diffusion device comprising:

a case having a first opening in a first end and a second opening in a second end;

at least one container in said case for containing a liquid chemical;

said container having an open upper end;

at least one support body;

a material on a surface of said support body;

said material having an end disposed to contact said liquid chemical in said container;

said material being of a type capable of absorbing said liquid chemical from said container through capillary action;

said material being gas-permeable;

a surface of said material being exposed to said first opening;

an other surface of said material being exposed to said second opening;

means for moving air into one of said first opening and said second opening, and out the other thereof, whereby said air passes through said material, and evaporates said liquid chemical; and said means for moving includes means for switching between moving air in said first opening and out said second opening and in said second opening and out said first opening.

5. A chemical diffusion device comprising:

a case having a first opening in a first end and a second opening in a second end;

a plurality of containers including a first, second and third container in said case for containing a liquid chemical;

said containers having an open upper end;

a plurality of gas-permeable support bodies including a first support body above a second support body;

said support bodies supporting a gas-permeable material on a surface of said support bodies;

said material being of a type capable of absorbing said liquid chemical and having an end disposed to contact said liquid chemical in said first container;

said material having a lower end disposed to drip into said second container to collect an excess of said liquid chemical from said material;

said material on a surface of said second support body receiving an overflow of said liquid chemical from said second container;

a surface of said material being exposed to said first opening;

an other surface of said material being exposed to said second opening; and means for moving air into one of said first opening and said second opening, and out the other thereof, whereby said air passes through said material, and evaporates said liquid chemical.

6. A chemical diffusion device according to claim 5, further comprising a cap disposed on an upper portion of said case; and said cap having an intake opening through which said liquid chemical is added.

7. A chemical diffusion device according to claim 6, wherein:

said case and said support bodies are substantially cylindrical;

said support bodies being constructed of a lattice work structure; and said first end is an upper end and said second end is a lower end.

8. A chemical diffusion device according to claim 5, wherein said material has a tongue portion on an upper end, a thin portion on a lower end and a thick portion therebetween;

said tongue portion being disposed to contact said liquid chemical; and said thick portion being capable of containing large amounts of said liquid chemical.

9. A chemical diffusion device according to claim 5, wherein said material is a gauze.

10. A chemical diffusion device according to claim 5, wherein said means for moving includes means for switching between moving air in said first opening and out said second opening and in said second opening and out said first opening.

11. A chemical diffusion device according to claim 10, wherein said means for moving includes a motor driven fan.

12. A chemical diffusion device comprising:

a case having a first opening in a first end and a second opening in a second end;

at least a first container and a second container in said case;

said second container supporting a gas permeable support;

said support including at least an inner and outer surface;

at least said second container shaped for containing a liquid chemical;

a permeable material mounted to at least one surface of said support;

said permeable material having an end disposed from said support and inserted within said second container;

a surface of said permeable material exposed to said first opening;

an other surface of said permeable material being exposed to said second opening;

said permeable material being of a type capable of absorbing said liquid chemical through capillary action; and means for moving air into one of said first opening and said second opening, and out the other thereof, whereby said air passes through said material and evaporates said liquid chemical.

13. A chemical diffusion device as in 12, wherein:

said permeable material is mounted on said inner surface of said support.

14. A chemical diffusion device as in 12, wherein:

said permeable material is mounted on said outer surface of said support.

15. A chemical diffusion device as in 12, wherein:

said permeable material is mounted on said inner and said outer surface of said support body.

* * * * *